No. 791,800. PATENTED JUNE 6, 1905.
D. L. LAUR.
PHOTOGRAPHIC ATTACHMENT FOR FIREARMS.
APPLICATION FILED OCT. 3, 1904.
2 SHEETS—SHEET 1.
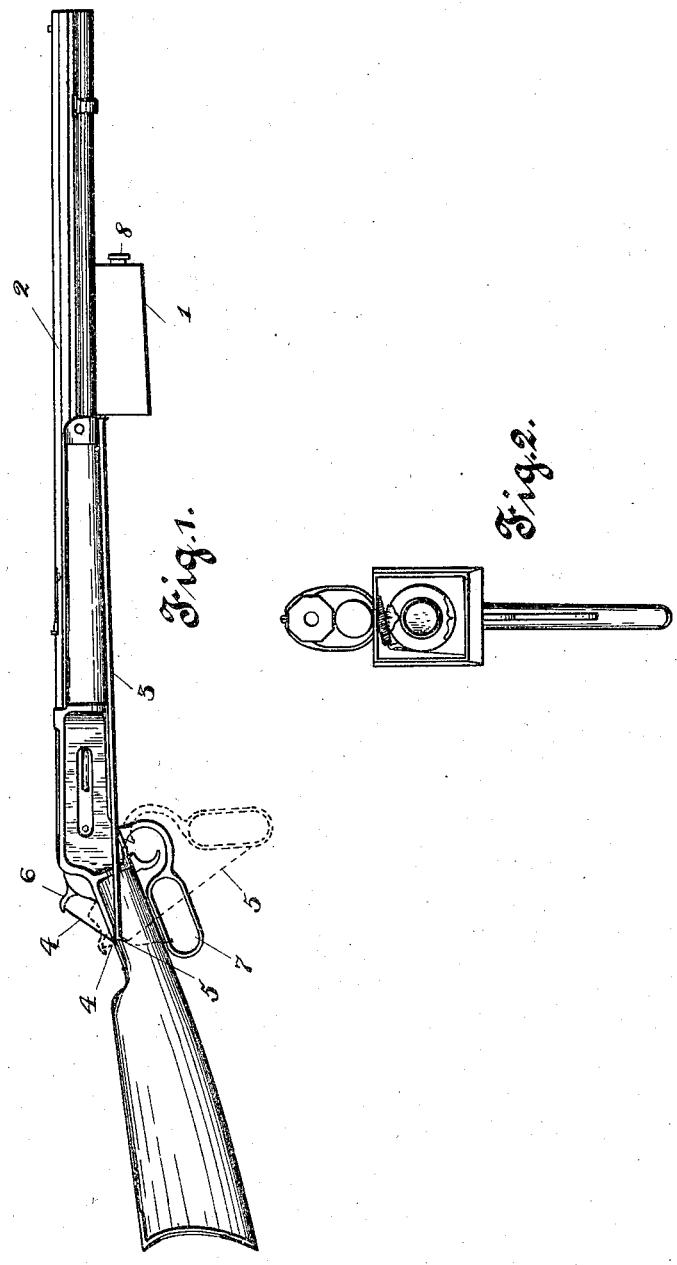
WITNESSES:
W. J. Cathcart.
J. S. See.
Delbert Leroy Laur. INVENTOR
BY
Geo. B. Willcox. ATTORNEY No. 791,800. PATENTED JUNE 6, 1905.
D. L. LAUR.
PHOTOGRAPHIC ATTACHMENT FOR FIREARMS.
APPLICATION FILED OCT. 3, 1904.

2 SHEETS—SHEET 2.

WITNESSES:
W. J. Cathcart.
J. S. See.

INVENTOR
Delbert Leroy Laur.
BY
Geo. B. Willcox. ATTORNEY

No. 791,800. Patented June 6, 1905.

UNITED STATES PATENT OFFICE.

DELBERT LEROY LAUR, OF INDIAN RIVER, MICHIGAN.

PHOTOGRAPHIC ATTACHMENT FOR FIREARMS.

SPECIFICATION forming part of Letters Patent No. 791,800, dated June 6, 1905.

Application filed October 3, 1904. Serial No. 226,970.

*To all whom it may concern:*

Be it known that I, DELBERT LEROY LAUR, a citizen of the United States, residing at Indian River, in the county of Cheboygan and State of Michigan, have invented certain new and useful Improvements in Photographic Attachments for Firearms; and I do hereby declare the following to be a full, clear, and exact description of the invention, such as will enable others skilled in the art to which it appertains to make and use the same.

This invention is a photographic attachment for firearms, and relates more particularly to the combination of a photographic camera with a shotgun or rifle of any suitable or ordinary construction and devices whereby the camera is actuated to take a photograph of the object fired at with each shot of the gun.

With these objects in view the device consists in the constructions and combination of parts and the equivalents thereof shown in the accompanying drawings and set forth in this specification.

Figure 3:
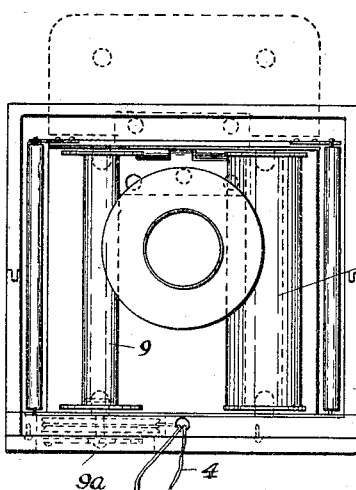
Figure 4:
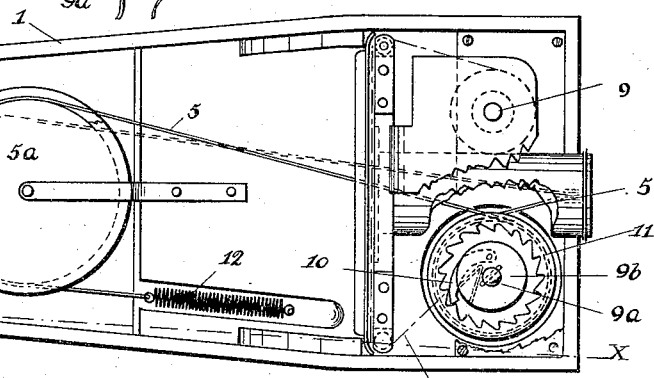

In the drawings, Figure 1 is a side view of a magazine-rifle with my camera attachment in place. Fig. 2 is a front view of the same. Fig. 3 is a rear view of the camera, showing the film-spools. Fig. 4 is a top plan view of the camera mechanism; and Fig. 5 is a vertical section of the camera, taken on the line $xx$ of Fig. 4.

As is clearly shown in the drawings, the device consists in a camera 1, attached by any suitable means to the under side of the barrel 2 of a gun. A tube 3 or other suitable guide is fixed to the gun at the rear of the camera and extends back to the vicinity of the hammer. Within the tube 3 are two cords 4 and 5, one of which, 4, is attached to the hammer 6, and the other cord, 5, is attached to the magazine-lever 7. The cord 4, which is connected to the hammer, extends through the tube 3 to operate the camera-shutter, and the cord 5 extends through the tube and operates the film-spools of the camera to the effect that when the magazine-lever 7 is pulled down to the position shown by dotted lines in Fig. 1 in order to discharge the cartridge and reload a new film is brought into position in the camera.

When the hammer 6 is drawn back before firing, the cord 4 is slack, and when the gun is fired the hammer 6 jerks the cord 4, which snaps the shutter and makes an exposure at the instant the shot is fired. By this means the marksman need pay no attention to the camera, as the operation of loading and firing the gun results in a picture of the mark at each shot.

Figure 5:
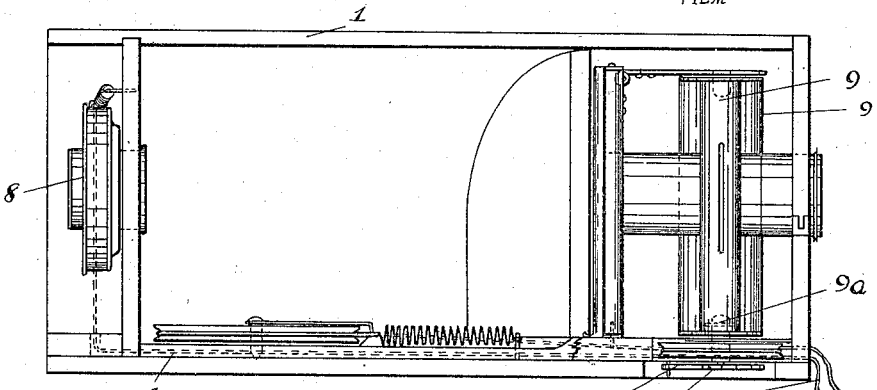

The construction of the camera mechanism which I prefer to use is illustrated in Figs. 3, 4, and 5, where 8 is lens and shutter operated by the cord 4, which passes back through the camera into the tube 3, as above described. The shutter and lens may be of any suitable construction. To operate the film-spools 9, which may be of any of the ordinary well-known constructions usual in photographic cameras, I provide below the spindle $9^a$, upon which the winding-spool rests, a plate $9^b$, carrying a spring-pressed pawl 10, which engages the teeth of an internally-toothed ratchet-wheel 11, which is revolubly mounted on the bottom of the camera.

The cord 5, as it comes from the magazine-lever 7, makes one turn around the grooved periphery of wheel 11 and thence around an idler $5^a$, the opposite end of the cord being secured to a flexible spring 12. When the cord 5 is pulled by the operation of magazine-lever 7, the teeth of the wheel 11 engage pawl 10 and revolve the spindle $9^a$, that carries the film-spool, sufficiently to bring a new film into position. When the magazine-lever 7 is brought back to its normal position against the stock of the gun, cord 5 is slack and spring 12 operates to reverse the movement of wheel 11 and spring it back to its original position, the film remaining stationary.

To prevent friction of pawl 10 from drawing back the film, I provide a ratchet-wheel 13 on the lower end of the spindle $9^a$. A suitable pawl 14, preferably formed of a light spring, engages the wheel 13 and prevents backward movement of the spindle $9^a$.

While I have shown and described a certain specific construction of camera, I do not desire to confine myself to this construction.

What I claim as my invention, and desire to secure by Letters Patent, is as follows:

1. The combination in a magazine-gun of the class described, of a photographic camera secured to the barrel of said gun, a cord fastened at one end to the shutter of said camera and at the other end to the hammer of said gun; together with a second cord connecting the film-operating mechanism of the camera to the magazine-lever of said gun; and means for guiding said cords, for the purpose set forth.

2. The combination in a magazine-gun of a photographic camera secured to the barrel of said gun, a cord fastened at one end to the shutter of said camera and at the other end to the cartridge-firing mechanism of the gun; together with a second cord connecting the film-operating mechanism of the camera to the magazine-operating mechanism of the gun; and means for guiding said cords.

In testimony whereof I affix my signature in presence of two witnesses.

DELBERT LEROY LAUR.

Witnesses:
E. N. CHADWICK,
PHILIP W. CREASER.